D. DICK.

Improvement in Steam-Traps.

No. 130,490. Patented Aug. 13, 1872.

Witnesses:
Edwin J. McLain
Jno Williams

Inventor:
David Dick
by R. H. Whittlesey

UNITED STATES PATENT OFFICE.

DAVID DICK, OF NEW YORK, N. Y., ASSIGNOR TO HIMSELF AND WILLIAM H. LEWIS, OF SAME PLACE.

IMPROVEMENT IN STEAM-TRAPS.

Specification forming part of Letters Patent No. 130,490, dated August 13, 1872.

*To all whom it may concern:*

Be it known that I, DAVID DICK, of the city, county, and State of New York, have invented certain new and useful Improvements in Steam-Heating Apparatus; and do hereby declare the following to be a full and exact description thereof, reference being had to the accompanying drawing and to the letters of reference marked thereon.

The nature of my invention consists in the construction and arrangement of a steam-trap for discharging the condensed water as accumulated from steam-heating apparatus, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
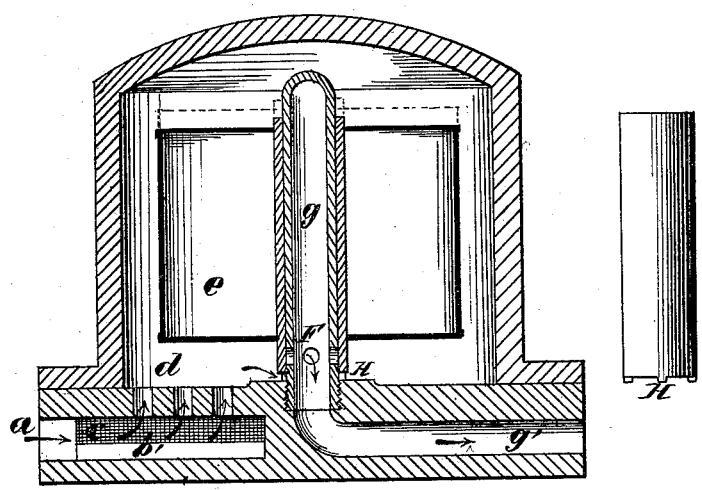
Figure 2:
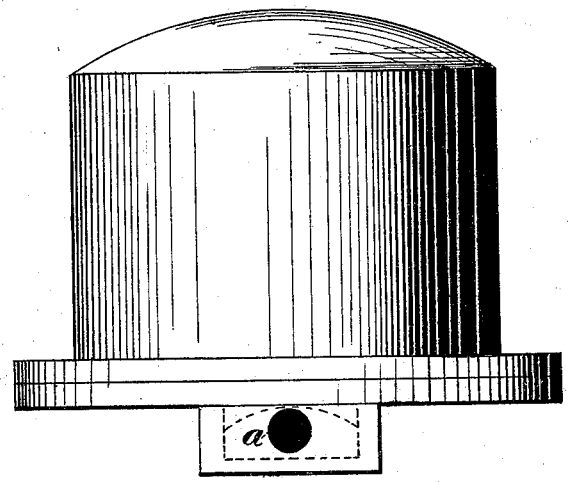

Figure 1 is a longitudinal vertical section, and Fig. 2 a front elevation of my device. Fig. 3 is a side view of the center tube of the float.

$d$ represents the main chamber provided with a central vertical discharge-tube, $g$, which is closed at its upper end, and provided, near the bottom of the chamber, with openings F. The lower end of the tube $g$ opens into a tube, $g'$, under the chamber $d$, as shown in Fig. 1. $e$ represents the balance-float provided with a central tube, which fits over the discharge-tube $g$ and projects a suitable distance below the float, having at its lower end bearing-points H. These bearing-points may be dispensed with, if so desired, or one or more may be used. $b$ is a sediment-chamber under the main chamber $d$ provided with a front inlet, $a$. Inside of the sediment-chamber $b$ is a wire-gauze strainer, $c$, and above are openings leading into the main chamber. The water and steam enters through the opening $a$, passing into the sediment-chamber $b$, and through the strainer $c$ into the main chamber $d$, raising the float $e$, thereby opening the outlets F in the discharge-tube $g$. The float rises and falls, opening and closing the outlets F, according to the quantity of water accumulating in the main chamber $d$.

Having thus fully described my invention, what I claim as new, and desire to secure by Letters Patent, is—

The combination of the main chamber $d$ with the discharge-pipe $g$ $g'$ having outlets F, the sediment-chamber $b$ with strainer $c$, and the balance-float $e$ with central tube and bearing-points H, all constructed and arranged substantially as and for the purposes herein set forth.

DAVID DICK.

Witnesses:
GEO. S. THOMPSON,
C. W. WITHEY.